UNITED STATES PATENT OFFICE.

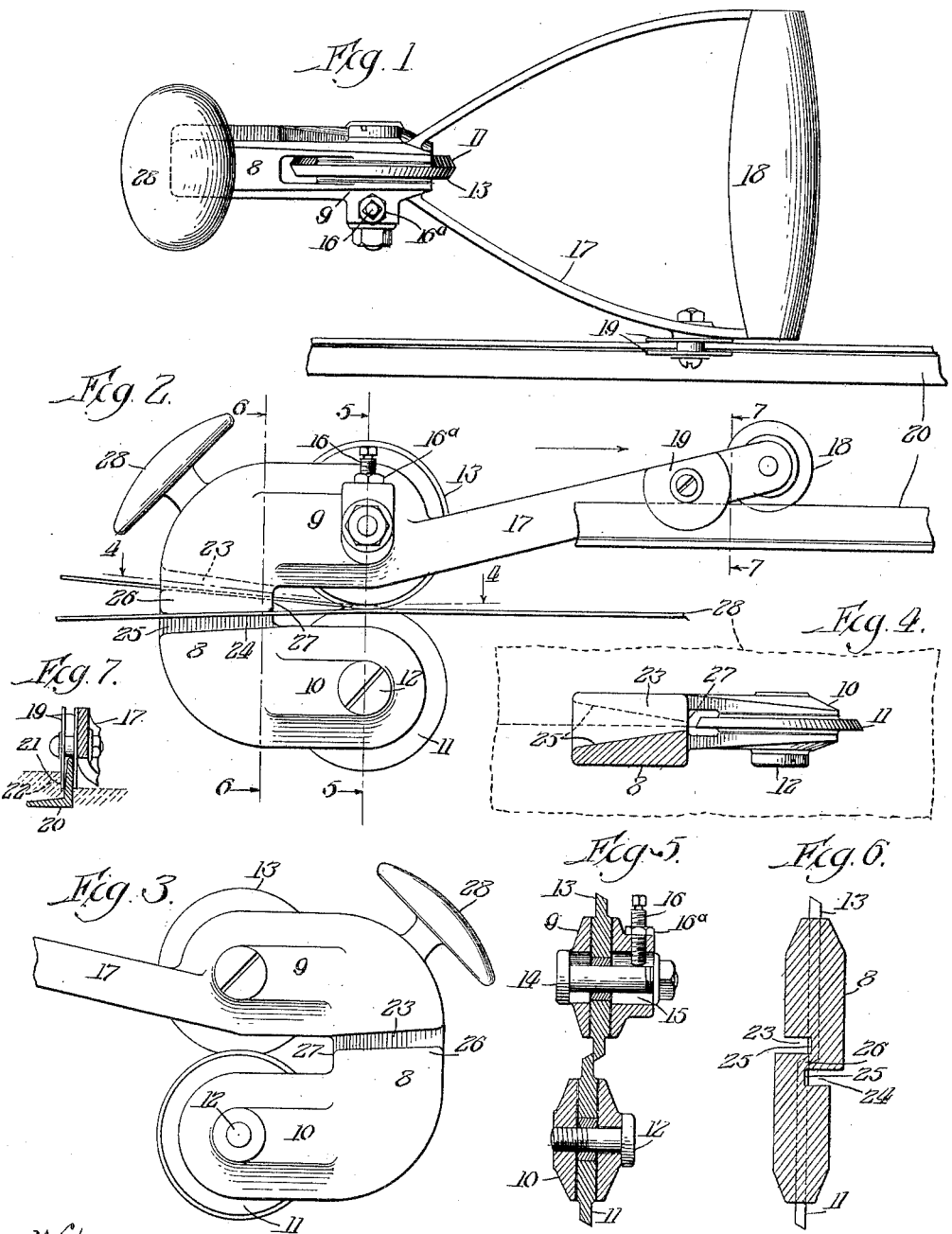

EDWARD A. LUNDY, OF ROCKFORD, ILLINOIS, ASSIGNOR OF ONE-HALF TO J. A. GRANDLAND, OF RIVER FOREST, ILLINOIS.

SHEET-MATERIAL CUTTER.

1,098,671. Specification of Letters Patent. Patented June 2, 1914.

Application filed May 16, 1913. Serial No. 768,025.

*To all whom it may concern:*

Be it known that I, EDWARD A. LUNDY, a citizen of the United States, residing at Rockford, in the county of Winnebago and State of Illinois, have invented certain new and useful Improvements in Sheet-Material Cutters, of which the following is a specification.

The object of this invention is to construct a cutting tool adapted to cut sheet material, more particularly sheet metal, and to enable the cutter to accomplish this purpose I provide a novel form of clearance and guide means in the body of the tool at the side thereof following the cutting means which maintain the cut parted portions of the metal in a natural and unrestrained position during the cutting operation.

The further object is in the provision of a manually operated tool for cutting sheet metal in which the sheet metal is adapted to be held in a fixed position and the cutter drawn manually across the face of the metal to make a line cut therethrough; and further to provide guide means by which the cutting tool may be guided positively during its cutting operation.

In the accompanying drawings: Figure 1 is a plan view of my improved cutting tool showing a portion of a guide rail in connection therewith. Fig. 2 is a side elevational view of the cutting tool showing it in an operative cutting position with a sheet of metal. Fig. 3, is a side view of the opposite side of the cutter from that shown in Fig. 2. Fig. 4, is a plan sectional view taken on the line 4—4 of Fig. 2, the metal shown dotted. Fig. 5, is a vertical section through the cutting rolls as taken on the line 5—5 of Fig. 2. Fig. 6, is a vertical sectional view taken on the line 6—6 of Fig. 2. Fig. 7, is a detail sectional view on the line 7—7 of Fig. 2.

The present method of cutting sheet metal is either through the use of hand shears or press shears such as are embodied in a fixed machine with shears of various lengths and which can make a cut only corresponding to the length of its shears. With my improved cutting tool a cut may be made the entire length of any length of sheet metal, also a curved or ogee cut may be made if so desired. The feature which enables such cuts to be made through sheet metal by roller cutters is the means for providing clearance and guidance of the two parted members of metal after it leaves the cutting rolls. The tool in which this means is embodied in the present disclosure, is adapted to be manually operated and its construction is as herein set forth.

The main body 8 of the tool has extending therefrom spaced apart, upper and lower roll supporting arms 9 and 10 respectively, the arms being offset from vertical alinement for structural efficiency and each arm formed centrally open vertically so as to carry a cutter roll in its opening. In the opening of lower arm 10 is mounted a cutter roll 11 upon the bearing bolt 12 which is screw-fixed in said arm; and in the upper arm 9 is mounted a cutter roll 13 upon the bearing bolt 14 which is adjustable vertically in the opening 15 through the arm, by the adjusting screw 16 provided with a lock-nut 16ª. These rolls are offset from vertical alinement, being carried centrally in the carrying arms, have their adjacent side faces straight and in contact one opposite the other at their adjacent portions, and have their peripheral edges beveled forming with their straight faces, cutting edges; such rolls forming a commonly used form of cutting means.

A handle shank 17 is fixed to the portion of arm 9 at a close proximity with the cutting point of the rolls, with diverging arms which carry at their spaced ends a handle grip 18. Guide means are carried by the handle to guide the tool from lateral displacement during operation and to coöperate with guide ways which are held fixed and which may be formed in various predetermined pattern curves to cut special shapes of metal. A suitable form of guide means are two spaced ears 19 carried by the handle and adapted to straddle a guide way, here shown in the form of an angle iron length 20. Such a form of guide means is adapted to be employed when the cutting is bench work and the angle guide or suitable fixed rail is positioned fixed relative to the metal. The tool may be also guided from lateral displacement by running an edge 21, as in Fig. 7, against a raised edge 22 (shown dotted) of a fixed member, this method being used in connection with different types of sheet metal working machines in which the metal is held fixed in the machine, for instance a cornice break, in which 22 is an edge of said machine fixed relatively therewith.

The body portion 8 of the cutting tool is provided with guide or clearance passages 23 and 24 by which means the two parted strips of cut metal are allowed to assume natural positions after leaving the cutting rolls, so that said strips are not subjected to any binding or spreading strain in connection with the tool, thereby allowing the tool to be operated free from any frictional resistance from these edges. Said passages extend into the body 8 from opposite sides thereof, and to allow the parted cut sides of metal to pass without being spread, the inner walls 25 of the passages must be coincident in vertical alinement, or better, extend beyond each other beyond the line of cut of the rolls, as is clearly seen in Fig. 6 or in the plan view Fig. 4, where the sides 25 are clearly shown extending beyond the line of cut represented by the intermediate dotted line. In order to secure this result the passages are spaced apart vertically and disposed at a slight angle diverging from the cutting point of the rolls, this construction resulting in two features, that of providing guide means for maintaining the two cut portions parted vertically to allow no binding of the cut edges and to facilitate the cutting, and that of providing a substantial body portion 26 between the upper and lower portions of the body 8; Fig. 6 being at the narrowest portion of this body 26. Besides diverging vertically, the inner walls 25 of these passages diverge horizontally from the entrance end 27 thereof as will be clearly seen in Fig. 4, thus allowing the tool to cut various curved lines of cut, being limited in this movement by an edge of the metal coming in contact with a side 25. A handle 28 is fixed to the tool at the follower side of the tool.

In operation the sheet metal 28 to be cut should be held fixed relative to the guide means. The cutter is held by the operator, one hand gripping each handle, he being faced in the direction of travel of cut, and with the tool applied to the guide means and metal as seen in Fig. 2, the cutting operation is simply a pushing operation, the force being applied to the cutting rolls in a substantially direct line to the cutting point of the rolls which is evidenced from the positioning of the handles.

The passage of the tool through the metal to cut same and resulting in a passage of the cut parted sides through passages 23 and 24 has been above described as has also been the guiding of the tool through its cutting path, from lateral displacement. But these guide means serve a further function, that of maintaining the cutter body and passages in a proper cutting relation with the rolls and metal and although cutting may be done with the tool without guide means, yet it would be somewhat difficult to guide the tool properly. The tool may also be operated by drawing it through the metal, the operator gripping the handle 18 and moving in advance of the cutter, thus applying the force in advance of the rolls.

I claim as my invention.

1. A cutting tool for sheet material, comprising a body, cutting rolls carried thereby, two passages each extending from opposite sides of the body, into the body toward the line of cut of said rolls, the passages being spaced apart in separate planes, and the inner walls of said passages being tapered from a point adjacent the cutting rolls and said line of cut, diverging in a direction away from the openings of said passages.

2. A cutting tool for sheet material, comprising a body, cutting rolls carried thereby, two passages extending from opposite sides of the body, into the body and beyond the line of cut of said rolls, and the inner edges of said passages diverging from a point adjacent the rolls in a direction away from the rolls.

3. In a sheet material cutting tool, the combination with cutting rolls, of spaced passages in the tool, spaced in planes general to the direction of passage of material through the rolls and through which the cut adjacent portions of material may pass after leaving the rolls, the planes of said passages diverging from their ends adjacent the rolls, and the sides of the passages adjacent the cutting line of the rolls diverging from adjacent the cutting rolls, in a direction away from the openings of the passages.

4. In a sheet material cutting tool, the combination with a body carrying two rotary cutters for cutting a line cut, of means for attaching a handle to said body with the handle spaced from the body in the direction of cutting, and guide means carried by said handle means or handle, being located laterally spaced from the line of cut of the tool and adapted to coöperate with guide means separate from the tool.

5. A cutting tool for sheet material, comprising a body portion having cutting rolls in connection therewith, clearance passages in the body portion through which cut adjacent edges of material may pass from said cutting rolls, a handle for moving the cutting tool, and means having connection with said handle for guiding the tool with the cutting rolls and clearance passages held in a positive relation laterally to the material being cut.

6. In a sheet material cutting tool, the combination with a body carrying two rotary cutters for cutting a line cut, of means for operating the tool comprising an extension reaching from said body in a direction common to the line of cut of the tool and being rigid with said body during operation, a handle at the end portion of said extension, and guide means carried by said extension spaced laterally from said line of cut and adapted to coöperate with guide means separate from the tool.

In testimony whereof I have hereunto set my hand in presence of two subscribing witnesses.

EDWARD A. LUNDY.

Witnesses:
JOHN F. M. CONNER, Jr.,
A. O. BEHEL.